United States Patent
Stephan et al.

(10) Patent No.: US 8,045,478 B2
(45) Date of Patent: Oct. 25, 2011

(54) PERFORMANCE MEASUREMENT IN A PACKET TRANSMISSION NETWORK

(75) Inventors: Emile Stephan, Pleumeur Bodou (FR); Jean-Louis Simon, Lannion (FR); Yann Adam, Treguier (FR)

(73) Assignee: France Telecom, Paris (FR)

( * ) Notice: Subject to any disclaimer, the term of this patent is extended or adjusted under 35 U.S.C. 154(b) by 1331 days.

(21) Appl. No.: 11/579,812

(22) PCT Filed: May 3, 2005

(86) PCT No.: PCT/FR2005/001112
§ 371 (c)(1),
(2), (4) Date: Nov. 7, 2006

(87) PCT Pub. No.: WO2005/122474
PCT Pub. Date: Dec. 22, 2005

(65) Prior Publication Data
US 2008/0259809 A1    Oct. 23, 2008

(30) Foreign Application Priority Data
May 7, 2004    (FR) ..................................... 04 04984

(51) Int. Cl.
*H04L 12/26*    (2006.01)

(52) U.S. Cl. ......................... 370/248; 370/242; 370/253

(58) Field of Classification Search .................. 370/242, 370/248, 253
See application file for complete search history.

(56) References Cited

U.S. PATENT DOCUMENTS

| 4,607,362 | A | | 8/1986 | Hellwig et al. |
| 5,477,531 | A | * | 12/1995 | McKee et al. ................. 370/249 |
| 6,269,330 | B1 | * | 7/2001 | Cidon et al. .................... 714/43 |
| 7,065,482 | B2 | * | 6/2006 | Shorey et al. ................. 709/224 |
| 7,116,639 | B1 | * | 10/2006 | Gail et al. ...................... 370/252 |
| 2003/0103461 | A1 | * | 6/2003 | Jorgenson ..................... 370/241 |

FOREIGN PATENT DOCUMENTS

GB    761552 A    11/1956

OTHER PUBLICATIONS

Mandeville B., et al.: "Optimising IP network performance through active measurement"; British telecommunications engineering, London, GB. vol. 1, No. 2, Jul. 2002, pp. 6-13, XP001162345; ISSN: 0262-401X.

* cited by examiner

*Primary Examiner* — Jason Mattis
(74) *Attorney, Agent, or Firm* — McKenna Long & Aldridge LLP

(57) ABSTRACT

A data packet transmission network comprises a stream of packets of data sent by a first terminal passes in transit through at least one network equipment with which there is associated a stream measurement unit; wherein the first terminal and the measurement unit are connected to a collection unit. The measurement method comprising the following steps: the first terminal sends a specific stream of packets, each having a different determined size, the sizes being such that in a set of r packets, r being a positive integer less than or equal to the number of packets of the stream, there are not any two subsets of the set of r packets comprising the same number of packets and having the same cumulative total size; the measurement unit analyzes at least one packet and at most r packets of the stream passing in transit through the network equipment.

13 Claims, 2 Drawing Sheets

PERFORMANCE MEASUREMENT IN A PACKET TRANSMISSION NETWORK

This application claims priority from PCT/FR2005/01112, filed May 3, 2005, and French Patent Application No. 04 04984, filed May 7, 2004, which are hereby incorporated by reference in their entirety.

BACKGROUND OF THE INVENTION

The present invention relates to the field of telecommunication networks and more precisely to the field of the metrology of packet transmission telecommunication networks.

Metrology, in the literal sense of "science of measurement", is expanding in different network fields such as traffic characterization and modeling, traffic analysis and quality of service and performance optimization. Network metrology is also used to improve network supervision. One particular objective is to provide assistance with the dimensioning of a network and with diagnosing problems detected in a network.

The increasing complexity of networks, and in particular of the Internet, leads to a lack of knowledge of traffic and conditions of use. It is becoming more and more difficult to have real control of the network and its behavior.

The traffic of a network is generally made up of a plurality of streams of packets. A stream of packets is defined as an exchange of data between two terminals of a network the packets whereof have common characteristics, in particular common source, destination and service characteristics.

Metrology generally has the objective of determining measurements to be performed on the traffic of the network under study in order to obtain a better knowledge of that traffic.

Two main types of measurements are known. A first type is made up of measurements performed on a stream of test packets. To perform these so-called "active" measurements, a stream of test packets is sent across the network being studied from a sender first terminal to a receiver second terminal. A test packet generally has a specific format containing a first field indicating a time reference of sending the packet and a second field indicating the sequence number of the packet in the stream of test packets sent. Consequently, the receiver terminal determines a transmission lead time of a test packet from the sender terminal as a function of the first field of the packet. The receiver terminal can also detect losses of packets as a function of the second field of a test packet. More generally, a test packet is a packet whereof a sending time reference is known and that can be distinguished from other packets on reception in order to associate it with an arrival time reference or to determine that it has been lost.

It is thus possible to obtain performance characteristics of an "end-to-end" stream, i.e. of the complete path of the stream of test packets, from the sender to the receiver, and in particular measurements of the transmission lead time between the two terminals, on the basis of the known sending and receiving time references of the packets.

This first type of measurement therefore produces performance measurements on a complete path of the stream of test packets, i.e. between the sender terminal of the stream and the receiver terminal of the stream. The measurements obtained in this way relate to the test packets of a stream. Because of this they are qualitatively accurate.

One drawback of this type of measurement is that it provides information relating only to the extremities of the stream of test packets. Thus it is impossible to obtain information on a segment of the complete path between two network equipments or between a network equipment and one of the terminals. Information obtained in this way is therefore geographically inaccurate.

There is known a second type of measurement performed in a network equipment by an analysis of the streams passing in transit through it. These so-called "passive" measurements can be performed either by onboard measurement units in the network equipments or by measurement units (or passive probes) external to the network equipments and dedicated to passive measurements. The latter generally have less information available than onboard measurement units. These measurement units monitor the traffic circulating on the links between the network equipments. This type of passive measurement, widely used in existing networks, produces volumetric information for each stream and for each network equipment.

One drawback of this type of measurement is that it supplies information relating to a network equipment that is very difficult to correlate with other information relating to another network equipment. Consequently, even though it is possible to obtain relatively accurate topological information on a given segment by correlation, such correlation remains complex to implement, in particular if the streams are sampled in order to analyze them.

Another drawback of this type of measurement is that it provides only volumetric information relating to the stream for each network equipment, in particular the number of analyzed packets and the sum of the sizes of the analyzed packets for a given stream. Consequently, the information obtained by this type of measurement may prove to be qualitatively insufficient and even somewhat unreliable, in particular if the streams are sampled in order to analyze them.

It is thus beneficial to obtain qualitatively accurate information, i.e. information relating to the packets of a stream, and geographically accurate information, i.e. information relating to segments of the complete path of the stream in the existing networks.

Note that the expression "network equipment" refers to an active network equipment, i.e. one that fulfills an active processing function in the network, such as switches or routers, for example. An active processing function in the network may also be defined as the opposite of a passive processing function fulfilled in particular by a measurement unit.

SUMMARY OF THE INVENTION

The present invention aims to propose a solution tending to satisfy these requirements.

A first aspect of the invention proposes a measurement method for use in a data packet transmission network, wherein a stream of packets of data sent by a first terminal passes in transit through at least one network equipment with which there is associated a stream measurement unit; wherein said first terminal and said measurement unit are connected to a collection unit; said method comprising the following steps:
  the first terminal sends a specific stream of packets, each having a different particular size, the sizes being such that in a set of r packets, r being a positive integer less than or equal to the number of packets of the stream, there are not two subsets comprising the same number of packets and having the same cumulative total size;
  the measurement unit analyzes at least one packet and at most r packets of said stream passing in transit through the network equipment;
  the first terminal sends the collection unit a sent packet stream description, comprising a list including at least said determined sizes of the sent packets;

the stream measurement unit sends the collection unit a stream description comprising at least the number of analyzed packets and a sum of said determined sizes of the analyzed packets; and the collection unit identifies each analyzed packet of the stream as a function of the stream description and of said determined sizes of the sent packets in order to correlate said stream description and said sent packet stream description packet by packet.

A second aspect of the invention proposes a measurement system comprising means adapted to implement the above method.

A third aspect of the invention proposes a collection unit comprising means adapted to implement the above method.

Thanks to the above arrangements, it is possible to obtain geographically and qualitatively accurate information on traffic in the transmission network under study.

BRIEF DESCRIPTION OF THE DRAWINGS

Other aspects, objects and advantages of the invention will become apparent on reading the description of one of its embodiments.

The invention will also be better understood with the aid of the drawings, in which.

DESCRIPTION OF PREFERRED EMBODIMENTS

The invention may be used in all fields of metrology applied to packet transmission networks.

The invention proposes to couple active measurements and passive measurements in order to obtain the benefits of each of them. Accordingly, in one embodiment of the invention, two terminals (or active probes) exchange a test packet that is analyzed at several points of the network, in particular on the basis of time references for the passage of the packet.

The context of the invention is that of any type of network for transmission of packets of fixed size and packets of variable size. To illustrate the following description, an IP (Internet Protocol) network is taken by way of example, without limiting the scope of the invention. The invention may in particular be implemented under version 4 or version 6 of the Internet Protocol.

The invention applies to analysis methods comprising selecting packets from the streams analyzed, for example sampling the streams, or to analysis methods with no selection of packets from the streams analyzed.

Note that, in one embodiment of the invention, a measurement unit generates stream descriptions comprising information relating to the stream whereas a terminal generates packet stream descriptions comprising information relating to the packets of the stream.

Figure 1:
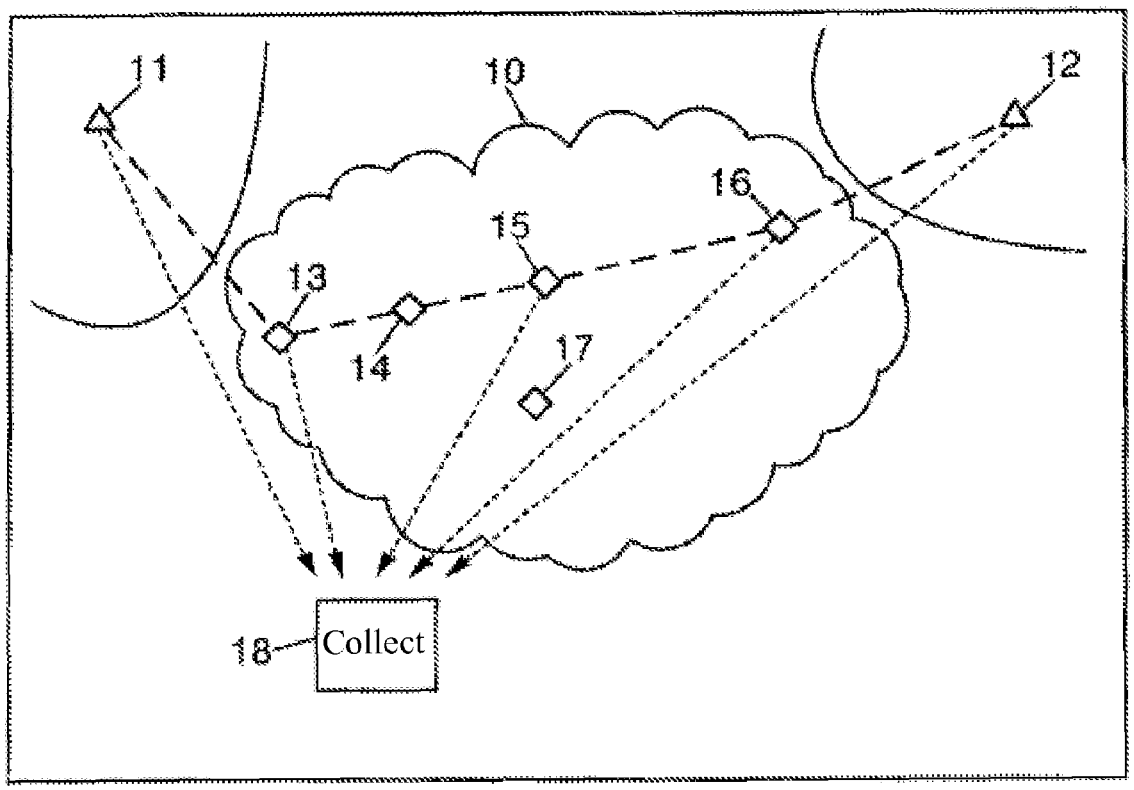
FIG. 1 is a diagram of the architecture of a network as claimed in one embodiment of the invention.

FIG. 1 represents a network architecture comprising a measurement system as claimed in one embodiment of the invention. A terminal 11 and a terminal 12 are connected to the IP network 10. The terminals 11 and 12 are adapted to generate streams of test packets. The IP network 10 comprises equipments 13, 14, 15, 16 and 17. Of these equipments, the equipments 13, 15 and 16 are each provided with an onboard stream measurement unit. The measurement units have a measurement export function. The invention also covers a configuration in which the stream measurement unit is an external entity monitoring traffic in transit on a transmission link between network equipments or between a terminal and an equipment. The terminals 11 and 12 and the equipments comprising stream measurement units 13, 15 and 16 are connected to a collection unit 18. This collection unit is adapted to receive information exported by the measurement units and the terminals 11 and 12 in order to group the information and correlate it to provide accurate information relating to the test packets of the stream and corresponding to particular segments of the complete path of the stream, in particular performance information relating to loss of packets or to the packet transmission lead time.

The terminals 11 and 12 may be fixed terminals. They may equally well be mobile terminals.

Figure 3:
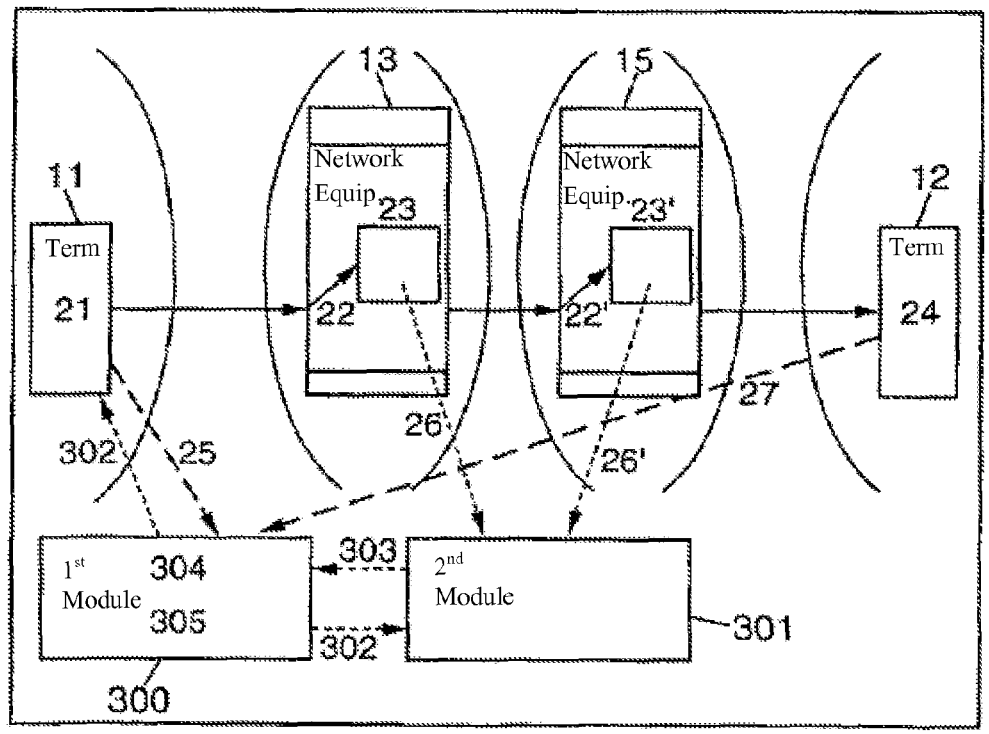
FIG. 3 shows a measurement method as claimed in one embodiment of the invention in a network architecture based on a collection unit comprising first and second modules.

Note that, in an embodiment of the invention shown in FIG. 3, the terminals are connected to a first module of a collection unit while the measurement units associated with a network equipment are connected to a second module of a collection unit. In certain situations described hereinafter, this kind of architecture is more advantageous.

In a preferred embodiment of the invention, the onboard stream measurement units in the equipments 13, 15, 16 implement stream analysis functions of the kind, currently being standardized, known as 'IPFIX', one implementation of which is distributed by Cisco Systems, Inc. under the name "Netflow". An "IPFIX" type service is a global analysis service of streams passing in transit through packet transmission network equipments, in particular routers and switches of IP, ATM, Ethernet or MPLS (Multiple Protocol Label Switch) type. This kind of service supplies an analysis of the streams entering an equipment. It is also adapted to accumulate statistical measurements relating to a given stream and to export those measurements asynchronously to a collection unit 18. The measurements are preferably exported to the collection unit by encoding the data in order to reduce the necessary bandwidth. The measurements may be exported on the fly, on expiry of a timer or on detection of a stream end. A measurement unit may also store these measurements to enable the collection unit 18 to download them.

The invention covers any other analysis function of a measurement unit supplying stream information and any other method of exporting that stream information.

In the remainder of this description, for reasons of clarity and by way of example, the network equipments provided with a stream measurement unit are routers. The invention also covers a stream measurement system in which the network equipments provided with a stream measurement unit are other network equipments, such as switches, for example.

A stream of test packets sent by the terminal 11 to the terminal 12 is generally identified by the following information:

the IP address, denoted T11_SrcAddr, and the logical port, denoted T11_SrcPort, of the sender terminal 11;

the IP address, denoted T12_DstAddr, and the logical port, denoted T12_DstPort, of the receiver terminal 12;

the protocol used, denoted Proto_test, for example TCP (standing for "Transmission Control Protocol"), UDP (standing for "User Datagram Protocol"), or ICMP (standing for "Internet Control Message Protocol").

The test protocol used may be any protocol encapsulated above the IP layer.

A network equipment provided with a stream measurement unit is in a position to supply stream descriptions that preferably comprise:
- a field for the input and output interface number, respectively denoted 'Input' and 'Output';
- a field for the number of analyzed and accumulated packets for a stream, denoted 'Packets';
- a field for the number of octets of the IP layer corresponding to the analyzed packets of the stream, denoted 'Octets';
- a field for a time reference for the passage of the first analyzed packet in the stream and a field for a time reference of the passage of the last analyzed packet in that stream, respectively denoted 'First' and 'Last';
- a field for the IP address of the input interface of the next router, denoted 'NextHop'.

If the equipment is a router, a stream description preferably further comprises a field for the numbers of the administrative domains, or AS (standing for "Autonomous System"), that have been crossed, respectively denoted 'SrcAS' and 'DstAS'.

A measurement unit of a router stores data relating to the streams that cross that router. On reception of a packet, the measurement unit determines if the packet belongs to a stream being analyzed. If it belongs to a stream being analyzed, the fields corresponding to the number of analyzed packets for that stream, to the sum of the sizes of the analyzed packets, and to the time reference of the passage of the last analyzed packet, respectively the fields 'Packets', 'Octets' and 'Last', are updated. If the received packet does not belong to a stream being analyzed, the measurement unit of the router initiates an analysis of that stream, storing, among other things, in the 'First' field, a time reference for the passage of the first packet of the stream. The measurement unit of the router terminates the analysis of a stream on detection of the end of the stream.

A measurement unit is generally adapted to export the stored data either when the end of the stream is detected or before the end of the stream being analyzed if a certain time has elapsed since the initiation of the analysis of the stream.

The stored data relating to the analysis of a stream is then encoded in order to export it to the collection unit 18 in the form of stream description tickets. A plurality of stream description tickets relating to a plurality of streams being studied may be grouped into a stream description block, as described hereinafter.

In addition to the technical data that the collection unit 18 needs to decode a description ticket, in particular a field denoted 'Version' identifying a software version of the IPFIX type service, the header of a stream description ticket also preferably indicates a time reference of the router. Fields denoted 'SysUptime' and 'UnixSecs' enable deduction of the time at which the stream description ticket was created. A field denoted 'FlowSequence' enables detection of loss of stream description tickets. Table 1 below shows the format of the exported stream description tickets in one embodiment of the invention.

TABLE 1

| Octets | Field name | Description |
|---|---|---|
| 0-1 | Version | IPFIX version number |
| 2-3 | Count | Number of streams exported in this packet (1-30) |
| 4-7 | SysUptime | Number of milliseconds elapsed since starting the machine |

TABLE 1-continued

| Octets | Field name | Description |
|---|---|---|
| 8-11 | UnixSecs | Number of seconds elapsed since Jan. 1, 1970: Unix timestamp |
| 12-15 | UnixNSecs | Number of residual nanoseconds since Jan. 1, 1970 |
| 16-19 | FlowSequence | Count of total number of streams exported |
| 20-23 | Reserved | Reserved octets |

In this table the field 'Reserved' may be used to describe information such as the sender (engine_'type' and id') and a sampling method (sampling_interval).

Each stream is preferably described in a stream description ticket as detailed in table 2 below, comprising in particular information relating to the administrative domains, or AS (standing for "Autonomous System") and relating to the Type of Service, or ToS, equivalent to a Quality of Service, or QoS.

TABLE 2

| Field | Octets | Description |
|---|---|---|
| SrcAddr | 0-3 | Source IP address |
| DstAddr | 4-7 | Destination IP address |
| NextHop | 8-11 | IP address of next router |
| Input | 12-13 | SNMP index of the input interface |
| Output | 14-15 | SNMP index of the output interface |
| Packets | 16-19 | Number of analyzed packets in the stream |
| Octets | 20-23 | Total number of octets in the analyzed packets of the stream |
| First | 24-27 | Time reference of the stream start Stream |
| Last | 28-31 | Time reference of end of stream |
| SrcPort | 32-33 | TCP/UDP source port or equivalent |
| DstPort | 34-35 | TCP/UDP destination port or equivalent |
| Pad1 | 36 | Not used (zero) |
| TcpFlags | 37 | TCP flags or cumulative flags |
| Proto | 38 | IP type (example TCP = 6; UDP = 17) |
| Tos | 39 | IP service type |
| SrcAS | 40-41 | Source AS number |
| DstAS | 42-43 | Destination AS number |
| SrcMask | 44 | Source IP address mask |
| DstMask | 45 | Destination IP address mask |
| Pad2 | 46-47 | Not used (zero) |

Each stream may also be described by a stream description ticket comprising only some of the information listed above.

The stream description blocks grouping stream description tickets are generally sent by the measurement units to a collection unit in the form of a UDP datagram. A UDP datagram of 1464 octets, corresponding to an Ethernet frame of 1500 octets, can contain up to 30 stream description tickets.

An IPFIX type service, implemented in software, generally cannot analyze all the packets passing in transit through a network equipment, for performance reasons. The measurement unit therefore reduces the number of packets to be analyzed by selecting certain packets in the stream of packets studied. The invention covers any way of selecting packets in a stream. In one embodiment of the invention, packets to be analyzed are selected by sampling the studied stream. The measurement units then export the stream information, as detailed in table 2, to the collection unit 18.

As stated above, test packets are injected into the network. In fact, the terminal 11 sends a stream of test packets to the terminal 12 across the network 10. The test packet stream therefore passes in transit through at least some of the network equipments 10. When test packets enter network equipments provided with a measurement unit, some or all of the test packets of the stream are analyzed.

In one embodiment of the invention, for each stream studied, the stream information from each measurement unit comprises at least the number of test packets analyzed and the sum of the sizes of the test analyzed packets in the stream.

Moreover, the terminals 11 and 12 each send the collection unit 18 a sent packet stream description, respectively a received packet stream description, for the sent, respectively received packets of the stream. This description preferably comprises a list including at least the sizes of the test packets sent, respectively received. This description may advantageously further comprise a time reference associated with sending, respectively receiving, each packet, as described in more detail hereinafter.

In one embodiment of the invention, the stream of test packets sent by the terminal 11 to the terminal 12 comprises a specific sequence of packets each having a different and particular size so that each of the packets of a subset of the specific sequence can be identified as a function of the number of packets of the subset and from the sum of the sizes of the packets of the subset. These two particular criteria of the specific test stream in particular enable identification of the analyzed packets by a given measurement unit if the test stream is analyzed by sampling it (or by any other way of selecting packets). In fact, in this latter case, only a subset of the specific sequence of test packets is analyzed.

One embodiment of the present invention based on sending a sequence of packets having the particular criteria is described hereinafter. The generation of a sequence of packets of this kind is based on the mathematical concept of a series of numbers with different partial sums of order r. A series of n numbers with different partial sums of order r, n being a positive integer and r being a positive integer less than or equal to n, is defined by the following characteristics:

the numbers of the series are all different;
the sums of two numbers of the series are all different;
the sums of three numbers of the series are all different;
. . . ;
the sums of r numbers of the series are all different.

In this kind of series of numbers, it is therefore possible to identify each number of a subset of the numbers of the series as a function of the number of elements of the subset and as a function of the sum of the numbers of the subset.

Accordingly, by generating a stream of packets the sizes whereof meet the criteria of a series of numbers with different partial sums of order r, as defined above, the collection unit 18 is in a position to identify each analyzed packet by a measurement unit if the number of analyzed packets by that measurement unit is less than or equal to r. In fact, the collection unit receives from the sender terminal 11 the list of the sizes of the packets of the stream sent. It then receives from a measurement unit the number of analyzed packets and the sum of the sizes of the analyzed packets. Given that each sum of sizes is unique for all of the subsets of a given number of packets, the collection unit thus identifies the size of each analyzed packet as a function of the number of analyzed packets. Then, as the packets of the specific test stream are of different sizes, each analyzed packet can therefore be easily identified.

There is therefore a way to generate a set of packets each having a different size for which each packet of any subset of the set of packets is identified uniquely by the number and by the sum of the sizes of the packets of the subset.

Let Sn denote a sequence of n packets Pi of different size denoted Ti where n is a positive integer and i is a positive integer from 1 to n.

For example, a sequence of six packets with respective sizes $T1=1$, $T2=2$, $T3=3$, $T4=4$, $T5=6$ and $T6=7$ does not satisfy the particular criteria described above, because it is not possible to determine uniquely a subset the number of packets whereof is 2 and the sum of the sizes of the packets whereof is equal to 7. In fact, the subset {T3; T4} and the subset {T1; T5} both match these two parameters.

The table below gives examples of a sequence of packets comprising four packets with the sizes indicated in the columns 1, 2, 3 and 4, respectively. In an example of this kind, the number of packets of a subset may be 1, 2, 3 or 4. It will be noted that the situation in which the subset comprises a single packet and the situation in which the subset comprises four packets are trivial, since in the first case the only packet is identified by its size and in the latter case the subset corresponds to the complete set. A 0 in the fifth column indicates that it is not possible to identify uniquely the packets of a subset of two packets as a function of the sum of the sizes of the packets of the subset concerned, whereas a 1 indicates the contrary. A 1 in the sixth column indicates that it is possible to identify uniquely the packets of a subset of three packets as a function of the sum of the sizes of the packets of the subsets concerned. A sequence of packets corresponds to an embodiment of the invention when, whatever the size of the subsets of packets, the packets constituting the subset can be identified uniquely. Accordingly, a 1 in the seventh column indicates that the sequence of packets studied can be used in an embodiment of the invention corresponding to r equal to 4, whereas 0 indicates the contrary.

TABLE 3

| Column 1 | Column 2 | Column 3 | Column 4 | Column 5 | Column 6 | Column 7 |
|---|---|---|---|---|---|---|
| 1 | 2 | 3 | 4 | 0 | 1 | 0 |
| 1 | 2 | 3 | 5 | 1 | 1 | 1 |
| 1 | 2 | 4 | 5 | 0 | 1 | 0 |
| 1 | 3 | 4 | 5 | 1 | 1 | 1 |
| 2 | 3 | 4 | 5 | 0 | 1 | 0 |
| 1 | 2 | 3 | 6 | 1 | 1 | 1 |
| 1 | 2 | 4 | 6 | 1 | 1 | 1 |
| 1 | 2 | 5 | 6 | 0 | 1 | 0 |
| 1 | 3 | 4 | 6 | 0 | 1 | 0 |
| 1 | 3 | 5 | 6 | 1 | 1 | 1 |
| 1 | 4 | 5 | 6 | 1 | 1 | 1 |
| 2 | 3 | 4 | 6 | 1 | 1 | 1 |
| 2 | 3 | 5 | 6 | 0 | 1 | 0 |
| 2 | 4 | 5 | 6 | 1 | 1 | 1 |
| 3 | 4 | 5 | 6 | 0 | 1 | 0 |
| 1 | 2 | 3 | 7 | 1 | 1 | 1 |
| 1 | 2 | 4 | 7 | 1 | 1 | 1 |
| 1 | 2 | 5 | 7 | 1 | 1 | 1 |
| 1 | 2 | 6 | 7 | 0 | 1 | 0 |
| 1 | 3 | 4 | 7 | 1 | 1 | 1 |
| 1 | 3 | 5 | 7 | 0 | 1 | 0 |
| 1 | 3 | 6 | 7 | 1 | 1 | 1 |
| 1 | 4 | 5 | 7 | 1 | 1 | 1 |
| 1 | 4 | 6 | 7 | 1 | 1 | 1 |
| 1 | 5 | 6 | 7 | 1 | 1 | 1 |
| 2 | 3 | 4 | 7 | 1 | 1 | 1 |
| 2 | 3 | 5 | 7 | 1 | 1 | 1 |
| 2 | 3 | 6 | 7 | 0 | 1 | 0 |
| 2 | 4 | 5 | 7 | 0 | 1 | 0 |
| 2 | 4 | 6 | 7 | 1 | 1 | 1 |
| 2 | 5 | 6 | 7 | 1 | 1 | 1 |
| 3 | 4 | 5 | 7 | 1 | 1 | 1 |
| 3 | 4 | 6 | 7 | 0 | 1 | 0 |
| 3 | 5 | 6 | 7 | 1 | 1 | 1 |
| 4 | 5 | 6 | 7 | 0 | 1 | 0 |

A specific sequence of n packets, the sizes whereof are denoted {T1, . . . , Ti, . . . Tn}, satisfying the particular criteria as defined above, may easily be transformed into another specific sequence of packets also satisfying the same particular criteria.

In fact, a specific sequence of n packets with respective sizes denoted {D1, ..., Di, ..., Dn} is generated such that:

$$Di = Ti + A, \text{ for } i \text{ equal to } 1 \text{ to } n,$$

where A is a positive integer.

A sequence of this kind satisfies the particular criteria.

A specific sequence of n packets with respective sizes denoted {M1, ..., Mi, ..., Mn} can also be obtained such that:

$$Mi = B*Ti, \text{ for } i \text{ equal to } 1 \text{ to } n,$$

where B is a positive integer.

A number sequence obtained in this way also satisfies the particular criteria as defined above.

A series of numbers of this kind can be determined by a search algorithm verifying if the two particular criteria are satisfied for the existing series of numbers. A series of N numbers is considered and the partial sums are then calculated for all subsets of all sizes. Series satisfying the particular criteria are selected in this way. It will be noted that, the higher the number N, the more combinations there are to be tested.

A series of this kind is preferably determined by a recursive type algorithm. In fact, from a number series satisfying the particular criteria, a search is effected for a supplementary element to be added to it in order for the new series obtained in this way still to satisfy the two particular criteria. Applying this kind of algorithm reduces the calculations very significantly.

Accordingly, the table below shows series of numbers with different partial sums of order r obtained recursively from an initial series satisfying the particular criteria:

The collection unit 18 then receives information relating to the packets sent and the packets received by the terminals, and in particular the size of each test packet, via the packet stream descriptions, and information relating to the stream, and in particular the number and the sum of the sizes of the analyzed packets. It is consequently in a position to identify each packet that has been analyzed in a measurement unit and therefore to calculate, where appropriate, a loss of test packets relating to a defined segment between a terminal and an equipment or between two network equipments, as detailed hereinafter. It will be noted that these latter calculations are possible if the complete test packet stream is analyzed or if only certain packets of the test stream are selected to be analyzed.

In one embodiment of the present invention, the terminal 11 sends a time reference of the sending of each packet Pi to the measurement connection unit 18 in a packet stream description.

In one embodiment of the invention, the sum of the sizes of the analyzed packets and the time references of the passage of the first and last analyzed packets are sent to the collection unit in the stream descriptions, more precisely in the fields respectively denoted 'Octets', 'First' and 'Last'.

Accordingly, the collection unit 18 further receives test packet sending and receiving time references, via the descriptions of streams of packets sent by the terminals, and a time reference of the passage of the first and last analyzed packets from each of the measurement entities of the network equipments, via the stream descriptions. It is consequently also in a position to supply a packet transmission lead time relating to a segment, as detailed hereinafter.

TABLE 4

{1, 2, 3, 5}.

| r = 2 100 elements | r = 3 100 elements | r = 4 | r = 5 | r = 6 | r = 7 | r = 8 |
|---|---|---|---|---|---|---|
| 1, 2, 3, 5, 8, 13, 21, 30, 39, 53, 74, 95, 128, 152, 182, 212, 258, 316, 374, 413, 476, 531, 546, 608, 717, 798, 862, 965, 1060, 1161, 1307, 1386, 1435, 1556, 1722, 1834, 1934, 2058, 2261, 2497, 2699, 2874, 3061, 3197, 3332, 3629, 3712, 3868, 4140, 4447, 4640, 5022, 5065, 5323, 5614, 6004, 6274, 6494, 6642, 6980, 7276, 7588, 8018, 8374, 9072, 9168, 9761, 10106, 10490, 11110, 11375, 11517, 12102, 12331, 12868, 13427, 13924, 14536, 14912, 15470, 15905, 16137, 16901, 17042, 17823, 19422, 19934, 20289, 20997, 21492, 22066, 22613, 22660, 23725, 24400, 24970, 25361, 26072, 26681, 27602 | 1, 2, 3, 5, 8, 14, 22, 30, 40, 55, 70, 100, 131, 155, 189, 212, 235, 271, 348, 391, 435, 479, 542, 593, 664, 754, 838, 902, 1008, 1057, 1153, 1296, 1390, 1464, 1608, 1826, 1964, 2102, 2248, 2472, 2545, 2707, 3008, 3091, 3365, 3492, 3784, 4104, 4319, 4518, 4636, 4963, 5273, 5449, 5627, 5699, 5993, 6306, 6718, 7416, 7678, 7930, 8191, 8611, 8839, 9031, 9632, 9835, 9974, 10359, 10957, 11563, 11980, 12335, 12498, 12783, 13066, 13562, 13787, 14376, 15433, 15925, 46035, 16964, 17356, 17915, 18554, 19555, 20034, 20100, 21403, 21702, 22468, 22839, 23781, 24571, 25315, 26078, 26475, 27365 | 1, 2, 3, 5, 8, 14, 25, 45, 70, 85, 132, 151, 221, 237, 325, 346, 436, 508, 593, 607, 746, 824, 932, 968, 1126, 1153, 1377, 1405, 1552, 1578, 1817, 1915, 2079, 2172, 2356, 2453, 2565, 2795, 2843, 3107, 3249, 3475, 3589, 3703, 3858, 3973, 4278, 4562, 4570, 5047, 5086, 5567, 5662, 5735, 6227, 6562, 6614, 6909, 7276, 7458, 7612 | 1, 2, 3, 5, 8, 14, 25, 45, 85, 162, 257, 346, 542, 648, 876, 1360, 1483, 1865, 2503, 2648, 3682, 3807, 4701, 5898, 5971, 7545, 8005, 9220, 11333, 11644, 13544, 13663, 16359, 16713, 19562, 20654, 22894, 26115, 26675, 30075, 30116, 34569 | 1, 2, 3, 5, 8, 14, 25, 45, 85, 162, 310, 506, 595, 986, 1416, 2106 | 1, 2, 3, 5, 8, 14, 25, 45, 85, 162, 310, 506, 1187, 2318, 3910 | 1, 2, 3, 5, 8, 14, 25, 45, 85, 162, 310, 606, 1187, 2349, 4593, 9013, 15529, 24744, 35080 |

The present invention covers any other method of generating series of different partial sums of order r.

Thus the terminal 11 is preferably adapted to generate one or more different test packet sequences as described above. The terminal 11 may also be adapted to receive from an external control equipment commands for selecting a sequence of packets to send.

It will be noted that the order of sending the packets is not important for identifying the analyzed packets by a given measurement unit. On the other hand, for packet transmission lead time calculations, the value contained in the field 'First' is associated with the first analyzed packet and the value contained in the field 'Last' is associated with the last analyzed packet. It is important to know the order of sending and of transmission to carry out this association.

As the sequence of test packets sent satisfies the particular criteria, the collection unit identifies the analyzed packets. In order to optimize such identification, the collection unit preferably maintains one or more identification tables of packets in the stream based on information from the sent packet stream description sent by the terminal 11, as described hereinafter.

More generally, the collection unit 18 is in a position to supply the following information instantaneously:

- information relating to the path of the packets of the stream in the network; for example a list of one or more equipments through which the analyzed packets pass in transit;
- information relating to management of the equipments of the path of the stream in the network, for example a list of management addresses of one or more equipments through which the analyzed packets pass in transit;
- information relating to processing of the stream in the equipments of the path, for example a list of levels of quality of service applied by one or more equipments to the analyzed packets or a list of administrative domains crossed by the stream;
- network performance information relating to a loss of packets on a segment between one of the terminals and an equipment or between two terminals and/or a packet transmission lead time relating to a segment between one of the terminals and an equipment or between two equipments.

Under certain conditions it may prove very useful to reiterate successively the steps of sending of test packet streams by the terminal 11, of stream analysis in the network equipments, and of stream reception by the terminal 12. Under such conditions, the measurement unit is able to supply, by iteration and by correlation of information obtained on each iteration relating to a segment between one of the terminals and an equipment or between two equipments, statistics on measurements of performance such as those defined by the IETF (Internet Engineering Task Force) or the ITU (International Telecommunications Union), for example:

- an average time between two losses of packets;
- a loss of packets;
- a packet transmission lead time; and
- a transmission lead time variation.

Reiteration of the measurement process is also very useful if the analysis is performed on selected packets of the test stream, for example by sampling the test stream.

Accordingly, after reiteration of the steps, the collection unit is in a position to supply the following information more accurately and more exhaustively, by correlation of the data obtained on each iteration:

- information relating to the path of the packets of the stream in the network, for example a list of one or more equipments through which the analyzed packets pass in transit;
- information relating to management of the equipments of the path of the stream in the network, for example a list of management addresses of one or more equipments through which the analyzed packets pass in transit;
- information relating to processing of the stream in the equipments of the path, for example a list of levels of equality of service applied by one or more equipments to the analyzed packets or a list of administrative domains crossed by the stream;
- network performance information relating to a loss of packets on a segment between one of the terminals and an equipment or between two terminals and/or a packet transmission lead time relating to a segment between one of the terminals and an equipment or between two equipments.

It will be noted that the reiteration of the steps proves to be particularly advantageous if the analysis is effected on packets selected from the test stream, for example by sampling the test stream. In fact, in this case certain instantaneous vectors may provide incomplete information.

The term 'vector' refers to the oriented result of a measurement between two points. An end-to-end measurement vector can be obtained from vectors of segments of the end-to-end path. On the other hand, if the analysis is effected on all the packets of the test stream, the data listed above can be obtained by correlation without reiteration.

Figure 2:
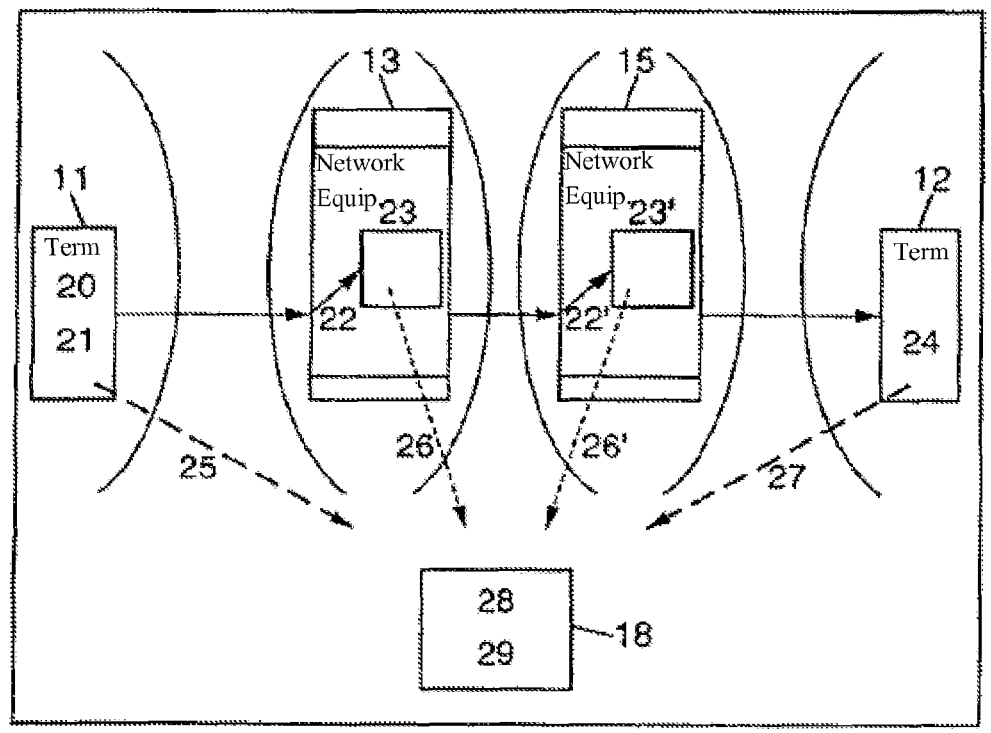
FIG. 2 shows a network measurement method as claimed in one embodiment of the invention.

FIG. 2 shows a network measurement method as claimed in one embodiment of the invention.

A stream of test packets sent by the terminal 11 to the terminal 12 passes through the equipments 13 and 15, each of which is provided with a stream measurement unit having an IPFIX type stream information export function. In the following description, the measurement units sample the stream of test packets before analyzing the stream. The invention covers other methods of selecting packets in a stream.

In one embodiment of the invention, the measurement units sample, manage and store stream descriptions in a table of stream characteristics. The structure of the entries in this table is analogous to the structure described above with reference to table 2. As claimed in the type of service of the analyzed stream, the functional level of the analysis or the network equipment type, this table may have additional fields or, conversely, some of the fields already list may not be filled in.

A network generally comprises an integer number N of equipments. The stream descriptions are sent to the collection unit 18 from one of the IP addresses of the equipment Ei, denoted Ei_SrcAddrMgt.

The packets of the IP stream sent by the terminal 11 to the terminal 12 are therefore observed when they enter the equipments Ei.

The measurement method therefore comprises the following steps:

- step 20: choice of the sequence of test packets to send; this step may be carried out by the terminal or on reception of an external command;
- step 21: sending of the sequence of test packets from the terminal 11 to the terminal 12;
- step 22, 22': selection of the test packets and analysis of the stream on the basis of the selected packets by the measurement units of the equipments Ei; during the selection step, each test selected packet is also date-stamped by associating a time reference with it;
- step 23, 23': analysis of the selected packets and storage in a stream characteristics table entry corresponding to the stream, then storage of a time reference for the passage of the first and last analyzed packets in the fields denoted 'First' and 'Last';
- step 24: reception of the sequence of test packets by the terminal 12;
- step 25: sending of the test packet stream description by the terminal 11 to the collection unit 18;
- step 26, 26': on end of stream detection (inactivity of the stream, for example), exporting of the stream descriptions by the equipments Ei to the collection unit 18;
- step 27: sending of the test packet stream description by the terminal 12 to the collection unit 18;
- step 28: grouping and correlation of data relating to this stream by the collection unit 18;
- step 29: production of the vectors of the information relating to equipments of the path of the stream or to segments of the path taken by the packets of that stream.

Each of the steps of the measurement method cited above is described in detail hereinafter.

In the step 20, the controller of the measurement system chooses a specific stream of packets from a set of test streams, denoted T11_Sn. For example, T11_Sn is a series of order 6, i.e. if a measurement unit analyzes at most six packets of this stream, the collection unit is in a position to identify each analyzed packet. The set T11_Sn preferably comprises a list of the sizes of the packets of the test stream.

In the step 21, the terminal 11 sends the terminal 12 a stream made up of a sequence of packets the sum of the sizes whereof enables the analyzed packets to be identified on the basis of the number of analyzed packets. The test packet sequence, denoted T11_Sn, is a sequence of packets {P0, P1, P2, . . . , Pn−1}. The sum of the sizes of the packets of the sequence T11_Sn is denoted T11_Sum_Sn.

The terminal 11 stores the sending time, denoted T11_Pit0, of each packet Pi of the stream in order to be in a position to provide a packet stream description.

In the step 22, 22', a measurement unit of an equipment Ei selects packets from this stream to analyze them.

The list of the packets Pk analyzed by an equipment Ei is denoted Ei_Sk. The number of elements in the list Ei_Sk is denoted Ei_Size_Sk and corresponds to the value of the field 'Packets' contained in the stream descriptions sent by the equipment Ei to the collection unit 18.

The sum of the sizes of the packets in the list Ei_Sk is denoted Ei_Sum_Sk and corresponds to the value of the field 'Octets' contained in the stream descriptions sent by the equipment Ei.

It is to be noted that two equipments rarely analyze the same packet. There are other selection techniques, currently being standardized by the IETF, that enable selection of the same packets at different points of passage of the network.

In the step 23, 23', the stream measurement unit of each equipment Ei analyzes a selected test packet and adds the characteristics of that packet to the characteristics already stored in the stream characteristics table relating to the stream of that packet.

The measurement unit manages a table in which each entry corresponds to a stream. If there is no entry for a given stream, identified by the data T11_SrcAddr, T11_SrcPort, T12_DstAddr, T12_DstPort, Proto_test, then it is created by the following steps:

- a time reference of the passage of the first test analyzed packet in this stream is stored in the field 'First' of the table entry;
- the IP address T11_SrcAddr of the terminal 11 is stored in the field 'SrcAddr' of the table entry;
- the TCP or UDP port T11_SrcPort of the terminal 11 is stored in the field 'SrcPort' of the table entry;
- the IP address of the terminal 12, T12_DstAddr, is stored in the field 'DstAddr' of the table entry;
- the TCP or UDP port T12_DstPort of the terminal 12 is stored in the field DstPort of the table entry;
- the values of the other fields of the table entry are filled in using routing information or packet switching information.

On reception of a packet, the number of octets of the test packet is added to the value of the field 'Octets' of the table entry, after which the 'Packets' field of the table entry is increased by 1.

A time reference of passage of the packet is stored in the field 'Last' of the table entry.

In the step 24, the terminal 12 receives the packet stream, certain packets whereof may have been lost. It stores a reception time reference and the size of each packet in order to prepare a received packet stream description.

The complete list of the packets Pk received by the terminal 12 is referenced T12_Sk. A list of this kind preferably comprises a list of the sizes of the packets of the test stream. The number of elements in the list T12_Sk is denoted T12_Size_Sk and corresponds to the value of the field 'Packets' of the description of that stream produced by the terminal 12.

The sum of the sizes of the packets from the list T12_Sk is denoted T12_Sum_Sk and corresponds to the value of the field 'Octets' of the packet stream description produced by the terminal 12.

In the step 25, the terminal 11 produces a sent packet stream description that it sends to the collection unit 18. A description of this kind preferably contains at least the following information:

TABLE 5

| | |
|---|---|
| SrcAddr | T11_SrcAddr |
| DstAddr | T12_DstAddr |
| NextHop | E1_Addr |
| Packets | n |
| Octets | T11_Sum_Sn |
| Packets_list | T11_Sn |
| times | {T11_P0t0, T11_P1t0, T11_P2t0, . . . , T11_Pn − 1t0} |
| SrcPort | T11_SrcPort |
| DstPort | T12_DstPort |
| Proto | Proto_test |
| Tos | T11_Tos |
| SrcAS | T11_SrcAS |
| DstAS | T11_DstAS |

In the step 26, 26', the stream measurement unit of Ei detects the end of the stream from criteria analogous to those of the IPFIX type software, i.e. after a packet absence lead time, or if the memory used to store stream descriptions is lacking.

The measurement unit then groups the stream descriptions into stream description blocks and sends them to the collection unit from the management address, denoted Ei_SrcAddrMgt. The IP destination address of such tickets is Ei_DstAddrMgt.

In the step 27, the terminal 12 sends the collection unit a receive packet stream description. A description of this kind preferably comprises the following characteristics:

TABLE 6

| | |
|---|---|
| SrcAddr | T11_SrcAddr |
| DstAddr | T12_DstAddr |
| NextHop | 0 |
| Packets | T12_Size_Sk |
| Octets | T12_Sum_Sk |
| Packets list | T12_Sk |
| times | {T12_P1t0, . . . , T12_Pn − 1t0} |
| SrcPort | T11_SrcPort |
| DstPort | T12_DstPort |
| Proto | Proto_test |
| Tos | T12_Tos |
| SrcAS | T12_SrcAS |
| DstAS | T12_DstAS |

In the step 28, the collection unit 18 groups the packet stream description tickets of the stream and the description tickets of the stream.

For the descriptions of a test steam received from an equipment Ei, the collection unit determines the first analyzed packet from the value contained in the field 'Packet' corresponding to the number of analyzed packets and from the value contained in the field 'Octets' corresponding to the sum of the sizes of the analyzed packets, and associates therewith as a passage time reference the value contained in the field 'First'. The collection unit then determines the last analyzed packet and associates with it as a passage time reference the value contained in the field 'Last'.

In one embodiment of the invention, the terminal 11 sends a stream of packets with sizes taken from the subseries of order 3 of the previous example. That series comprises the values 14, 22, 30, 40, 55, 70, 100, 131, 155 and 189. This packet stream is sent in the following order, P0 being the first sent packet and P9 the last sent sent packet:

P0 is of size 14;
P1 is of size 189;
P2 is of size 30;
P3 is of size 155;
P4 is of size 40;
P5 is of size 70;
P6 is of size 100;
P7 is of size 22;
P8 is of size 131; and
P9 is of size 55.

Given that the series considered is a third order series, the collection unit preferably has two tables available. In fact, a first table comprises sums of two elements and a second table comprises sums of three elements. The first table comprises 45 elements (C(10, 2)=45), including the following elements, for which the sum of the sizes precedes the set of the elements that correspond thereto:

203: (P0, P1);
44: (P0, P2);
169: (P0, P3);
. . .
219: (P1, P2);
344: (P1, P3);
. . .
153: (P7, P8);
77: (P7, P9);
186: (P8, P9).

The second table comprises 120 elements (C(10, 3)'120), including the following elements, for which the sum of the sizes precedes the set of the elements that correspond thereto:

233: (P0, P1, P2);
358: (P0, P1, P3);
199: (P0, P2, P3);
374: (P1, P2, P3);
243: (P0, P1, P4);
. . .
258: (P0, P1, P9);
. . .
208: (P7, P8, P9).

Accordingly, when the collection unit receives a stream description from a measurement unit comprising a number of analyzed packets equal to 3 and a sum of the sizes of the analyzed packets equal to 243, the collection unit refers to the second table and identifies the set of the three analyzed packets, and among them the first and last packets.

In one embodiment of the present invention, the collection unit sorts the sums of the sizes into increasing order in order to speed up the search.

The objective of such tables is to enable rapid searching of the subset of analyzed packets in the sequence. To this end, a hash coding operation may advantageously be used. In this case, the table maintained by the collection unit is a hash coding table, the theory of which is well known to the person skilled in the art. A table entry index is obtained as a function of the sum of the sizes and of a hash coding function.

It is possible that only one packet has been analyzed. If the number Ei_Size_Sk is equal to 1, that means that only one packet has been analyzed and therefore that only one passage time reference is available for this stream in the equipment Ei.

In one embodiment of the invention, the collection unit groups all of the received stream data to form the following table:

TABLE 7

| Field | T11 | ... | Ei | Ei + 1 | ... | T12 |
|---|---|---|---|---|---|---|
| SrcAddr | T11_SrcAddr | ... | T11_SrcAddr | T11_SrcAddr | ... | T11_SrcAddr |
| DstAddr | T12_DstAddr | ... | T12_DstAddr | T12_DstAddr | ... | T12_DstAddr |
| SrcPort | T11_SrcPort | ... | T11_SrcPort | T11_SrcPort | ... | T11_SrcPort |
| DstPort | T12_DstPort | ... | T12_DstPort | T12_DstPort | ... | T12_DstPort |
| Proto | Test_protocol | ... | Test_protocol | Test_protocol | ... | Test_protocol |
| Packets | n | ... | Ei_Size_Sk | Ei + 1_Size_Sk | ... | T12_Size_Sk |
| Octets | T11_Sum_Sn | ... | Ei_Sum_Sk | Ei + 1_Sum_Sk | ... | T12_Sum_Sk |
| NextHop | E1_Addr | ... | Ei + 1_Addr | Ei + 2_Addr | ... | 0 |
| Tos | T11_Tos | ... | Ei_Tos | Ei + 1_Tos | ... | T12_Tos |
| SrcAS | T11_AS | ... | Ei_AS or T11_AS | Ei_AS or T11_AS | ... | 0 |
| DstAS | 0 | ... | Ei + 1_AS or T12_AS | Ei + 2_AS or | ... | T12_AS |
| Input | 0 | ... | Ei_in | Ei + 1_in | ... | T12_in |
| Output | T11_out | ... | Ei_out | Ei + 1_out | ... | 0 |
| SrcAddrMgt | T11_AddrMgt | ... | Ei_AddrMgt | Ei + 1_AddrMgt | ... | T12_AddrMgt |
| P0_time | T11_P0t0 | ... | Ei_P0t0 or 0 | Ei + 1 P0t0 or 0 | ... | T12_P0t0 or lost |
| P1_time | T11_P1t0 | ... | Ei_P1t0 or 0 | Ei + 1_P1t0 or 0 | ... | T12_P1t0 or lost |
| P2_time | T11_P2t0 | ... | Ei_P2t0 or 0 | Ei + 1_P2t0 or 0 | ... | T12_P2t0 or lost |
| ... | ... | ... | ... | ... | | ... |
| Pn − 1_time | T11_Pn − 1t0 | ... | Ei_Pn − 1t0 or 0 | Ei + 1_Pn1t0 | ... | T12_Pn − 1t0 or lost |

In the step 29, in one embodiment of the invention, depending on the configuration of the collection unit, the latter may supply:
- information relating to the path of the packets of the stream in the network;
- information relating to the management of the equipments of the path of the stream in the network;
- information relating to processing of the stream in the equipments of the path;
- network performance information relating to a loss of packets on a segment between one of the terminals and an equipment or between two equipments and/or to a packet transmission lead time relating to a segment between one of the terminals and an equipment or between two equipments.

It can also calculate the packet transmission lead times and the packet losses on the complete path of the stream, as shown in the examples described hereinafter.

The packets P0 and P2 were analyzed on passing through Ei+1 only. The packet Pn−1 was analyzed on passing through Ei and Ei+1, as shown in the table below.

TABLE 8

| NextHop | T11 | ... | Ei | Ei + 1 | ... | T12 |
|---------|-----|-----|-----|--------|-----|------|
| P0 | X | ... | X | — | ... | X |
| P1 | X | ... | — | — | ... | X |
| P2 | X | ... | X | — | ... | lost |
| ... | ... | ... | ... | ... | ... | ... |
| Pn − 1 | X | ... | X | X | ... | X |

From the step 28, in one embodiment of the invention, the collection unit groups the Next Hop information of the analyzed packets as shown in the table below:

TABLE 9

| NextHop | T11 | ... | Ei | Ei + 1 | ... | T12 |
|---------|------|-----|---------|----------|-----|-----|
| P0 | E1_Addr | ... | Ei_Addr | — | ... | 0 |
| P1 | E1_Addr | ... | — | — | ... | 0 |
| P2 | E1_Addr | ... | Ei_Addr | — | ... | — |
| ... | ... | ... | ... | ... | ... | ... |
| Pn − 1 | E1_Addr | ... | Ei_Addr | Ei + 1_Addr | ... | 0 |

The collection unit supplies a NextHop instantaneous vector of the stream:

{E1_Addr, Ei_Addr, Ei+1_Addr, 0}.

Over a short time period, the production of Next Hop instantaneous vectors at the time of the successive measurements quickly determines the Next Hop of each equipment Ei and therefore the complete vector:

{T11_SrcAddr, E1_Addr, E2_Addr, . . . , Ei_Addr, Ei+1_Addr, . . . , Em_Addr, T12_DstAddr}.

Over a long period, and after the determination of the Next Hop complete vector, comparing the instantaneous vectors with the complete vector is a very quick way to detect modifications of the path taken.

From the step 28, in one embodiment of the invention, the collection unit 18 groups the source addresses used by the measurement units to export the stream descriptions to the collection unit, as shown in the following table.

TABLE 10

| SrcAddrMgt | T11 | Ei | Ei + 1 | T12 |
|------------|-----|-----|--------|-----|
| P0 | T11_AddrMgt | Ei_AddrMgt | — | T12_AddrMgt |
| P1 | T11_AddrMgt | — | — | T12_AddrMgt |
| P2 | T11_AddrMgt | Ei_AddrMgt | — | — |
| Pn − 1 | T11_AddrMgt | Ei_AddrMgt | Ei + 1_AddrMgt | T12_AddrMgt |

The collection unit supplies a management address instantaneous vector:

{T11_AddrMgt, Ei_AddrMgt, Ei+1 AddrMgt, T12_AddrMgt}.

Over a short period, the production of management address instantaneous vectors at the time of successive measurements quickly determines the management address of each Ei and therefore a complete vector:

{T11_AddrMgt, E1_AddrMgt . . . Ei_AddrMgt, Ei+1_AddrMgt, . . . , Em_AddrMgt, T12_AddrMgt}.

From the step 28, in one embodiment of the invention, the collection unit groups the AS information of the analyzed packets, as shown in the tables below, for the source AS and the destination AS.

TABLE 11

| SrcAS | T11 | Ei | Ei + 1 | T12 |
|-------|-----|-----|--------|-----|
| P0 | T11_AS | Ei_AS | — | — |
| P1 | T11_AS | — | — | — |
| P2 | T11_AS | Ei_AS | — | — |
| Pn − 1 | T11_AS | Ei_AS | Ei + 1_AS | — |

TABLE 12

| DstAS | PMAI | Ei | Ei + 1 | T12 |
|-------|------|-----|--------|-----|
| P0 | — | Ei + 1_AS | — | T12_AS |
| P1 | — | — | — | T12_AS |
| P2 | — | Ei + 1_AS | — | — |
| Pn − 1 | — | Ei + 1_AS | T12_AS | T12_AS |

The collection unit supplies an administrative domain instantaneous vector:

{T11_AS, Ei_AS, Ei+1_AS, T12_AS}.

Over a short period, the production of administrative domain instantaneous vectors at the time of the successive measurements quickly determines the source and destination administrative domains of the stream in each equipment Ei. Thus a complete vector is obtained:

{T11_AS, E1_AS, . . . , Ei_AS, Ei+1_AS, . . . , T12_AS}.

Over a long period, and after the measurement of the complete vector, comparing the instantaneous vectors with the complete vector is a way to detect immediately modifications of the path taken.

The ToS or QoS field determines the level of priority of a packet in a queue of a router (or other equipment). This information is very important, in particular in the interdomain context, for the verification of the provision of the devices for marking the quality of service.

From the step 28, in one embodiment, the collection unit groups the QoS information of the analyzed packets as shown in the table below.

TABLE 13

| QoS | T11 | Ei | Ei + 1 | T12 |
|---|---|---|---|---|
| P0 | T11_QoS | Ei_QoS | — | 0 |
| P1 | T11_QoS | — | — | 0 |
| P2 | T11_QoS | Ei_QoS | — | — |
| Pn − 1 | T11_QoS | Ei_QoS | Ei + 1_QoS | T12_QoS |

The collection unit 18 supplies a QoS instantaneous vector:
{T11_QoS, Ei_QoS, Ei+1_QoS, T12_QoS}.

Over a short period, the production of QoS field instantaneous vectors at the time of the successive measurements quickly determines the QoS field of each Ei and therefore a complete vector:
{T11_QoS, E1_QoS, . . . , Ei_QoS, Ei+1_QoS, . . . , T12_QoS}.

Over a long period, and after measuring the complete vector, comparing the instantaneous vectors with the complete vector is a way to detect immediately modifications of the QoS field of the stream. This comparison in particular verifies that the QoS field has not changed, even if the path has changed.

From the step 28, in one embodiment, the collection unit groups the instantaneous passage time references of each analyzed packet:

TABLE 14

| Passage time reference | T11 | Ei | Ei + 1 | T12 |
|---|---|---|---|---|
| P0_time | T11_P0t0 | Ei_P0t0 | — | T12_P0t0 |
| P1_time | T11_P1t0 | — | — | T12_P1t0 |
| P2_time | T11_P2t0 | Ei_P2t0 | — | — |
| Pn − 1_time | T11_Pn − 1t0 | Ei_Pn − 1t0 | Ei + 1_Pn − 1t0 | T12_Pn − 1t0 |

The collection unit then calculates instantaneous times between the different points of the network at which the same packet Pi has been analyzed. The table below details the times per segment, relative to each packet:

TABLE 15

| Time | T11 -> Ei | Ei -> Ei + 1 | Ei + 1 -> T12 |
|---|---|---|---|
| P0 | Ei_P0t0 − T11_P0t0 | — | — |
| P1 | — | — | — |
| P2 | Ei_P2t0 − T11_P2t0 | — | — |
| Pn − 1 | Ei_Pn − 1t0 − T11_Pn − 1t0 | Ei + 1_Pn − 1t0 − Ei_Pnt0 | T12_Pn − 1t0 − Ei + 1_Pn − 1t0 |

A packet is not analyzed systematically by all the equipments Ei.

Analyzing the packet Pn−1 enables the collection unit to supply an instantaneous transmission lead time vector of the complete path between the terminals 11 and 12:
{Ei_Pn−1t0-T11_Pn−1t0, Ei+1_Pn−1t0-Ei_Pn−1t0, T12_Pn−1t0-Ei+1_Pn−1t0}.

Analyzing the packets P0 and P2 enables only one intermediate measurement between the terminals 11 and 12.

These lead time calculations are very useful in particular for locating congestion in the network.

Analyzing the packets P0, P2 and Pn−1 is a fast way to calculate an average value, a minimum value and a maximum value of the transmission lead time between the terminal 11 and the equipment Ei+1.

Similarly, analyzing the packets P0, P1 and Pn−1 is a very fast way to calculate an average value for the transmission lead time between the equipment Ei+1 and the terminal 12.

Over a short period, the production of transmission lead time instantaneous vectors at the time of the successive measurements quickly determines complete vectors of the transmission lead times relating to the segments of the path of the stream.

Over a long period, and after measuring complete vectors, comparing the complete vectors and the instantaneous vectors is a very fast way to locate the segments whose transmission lead times, and therefore whose performance, worsen if the path is not changed. This also enables comparison of the performance of two different paths.

It will be noted that the transmission lead time of a packet is a function of a number of parameters including the size of the packet. In fact, a relatively large packet has a greater transmission lead time than a relatively small packet if the two packets are transmitted in equivalent environments. Accordingly, in order to be able to use instantaneous transmission lead times more accurately, in one embodiment of the invention, an instantaneous time calculated for a given test packet is related to the size of that test packet.

From the step 28, in one embodiment, the collection unit produces packet loss vectors.

The table below represents packet losses relating to the various segments of the path of the stream of packets.

TABLE 16

| Losses | T11 | Ei | Ei + 1 | T12 |
|---|---|---|---|---|
| P0 | 0 | 0 | 1 | 0 |
| P1 | 0 | 1 | 1 | 0 |
| P2 | 0 | 0 | 1 | 1 |
| Pn − 1 | 0 | 0 | 0 | 0 |
| TOTAL | 0 | 1 | 3 | 1 |

A '1' in the above table means that the packet has been lost or has not been analyzed and a '0' means that the packet has been analyzed. The losses are not counted directly segment by segment. In fact, one or more packets of the same stream may pass in transit through different equipments, especially if load distribution is applied to the path of the stream. Because of this, in order to confirm a packet loss, it is necessary to refer to the packets received at the terminal 12.

The loss vector relating to the packet P1, denoted {0, 1, 1, 0}, shows that if a packet is not analyzed in Ei this does not mean that the packet was lost before reaching the equipment Ei. It means that the packet has been lost or was not selected by the analyzer of Ei or has passed in transit through another equipment. For example, Ei and Ei+1 do not know that the packet P1 exists even though it probably passed through them in transit, since it reached the destination terminal 12.

The loss vector relating to the packet P2, denoted {0, 0, 1, 1}, indicates that the packet P2 was probably lost between Ei and the destination terminal 12, because it has not been received by the terminal 12 and Ei analyzed it.

In certain cases, it is advantageous to introduce a collection unit comprising two modules into the architecture of the network described above. For example, if a first module of a collection unit is adapted to receive and manage stream descriptions sent by the measurement units but not to receive packet stream descriptions from the terminals, a second module is added to receive the packet stream descriptions.

FIG. 3 shows a method as claimed in one embodiment of the invention used in an architecture of the above kind. The method comprises the following steps:

- step 302: sending to the terminal 11 and to the second module 301 a message requesting copying by the first module 300 of the test stream descriptions between the terminals 11 and 12, corresponding to a measurement start;
- step 21: sending of the sequence of test packets from the terminal 11 to the terminal 12;
- step 22, 22': selection of the test packets and analysis of the stream on the basis of the packets selected by the measurement units of the equipments Ei;
- step 23, 23': analysis of the selected packets and storage in a stream characteristics table entry corresponding to the stream, followed by storage in the fields denoted 'First' and 'Last' of a passage time reference of the first and last analyzed packets;
- step 24: reception of the sequence of test packets by the terminal 12;
- step 25: sending of the packet stream description by the terminal 11 to the first module 300;
- step 26, 26': on end of stream detection (inactivity of stream, for example), exporting of the stream descriptions by the equipments Ei to the second module 301;
- step 27: sending of the stream description by the terminal 12 to the first module 300;
- step 303: transmission on the fly of the stream descriptions between the terminals 11 and 12 by the second module 301 to the first module 300;
- step 304: grouping and correlation of the data relating to the stream by the first module 300;
- step 305: production by the first module 300 of the vectors of the information relating to equipments of the path of the stream or to segments of the path taken by the packets of this stream or relating to the complete path.

In a configuration in which the collection unit comprises two modules 300 and 301, the module 300 of the collection unit preferably uses input filtering to filter only the information relating to the streams studied.

In one embodiment of the invention, a stream description ticket further comprises a Time To Live field 'TTL'. Such information is conventionally contained in a field of an IP type packet header. By exporting this information, the collection unit is therefore able very easily to put the equipments Ei on the path of the stream into order.

The present invention proves to be highly advantageous in all fields of packet transmission network metrology, in particular for dimensioning networks, for commissioning and maintaining networks, and for monitoring the quality of service provided. In fact, in the event of detection of "end-to-end" transmission problems, one embodiment of the invention can very quickly locate the segment or segments of the complete path causing the problems, on the basis of very accurate and reliable measurements. Furthermore, the measurements provided are made available and usable very quickly. Moreover, one embodiment of the invention is very easy to implement in existing networks.

It will further be noted that it is easy to deduce from the present description an embodiment of the present invention in which a terminal sends the packet stream to more than one terminal. Accordingly, the measurement method as claimed in one embodiment of the invention may easily be applied to 'multicast' transmission to multiple destinations.

In a situation of this kind, it is possible for some or all of the terminals receiving the packet stream sent to send a received packet stream description to the collection unit.

If the collection unit receives a plurality of received packet stream descriptions it can, for example, deduce therefrom the number of receiver terminals that have actually received the 'multicast' stream.

In another embodiment of the present invention, the function of the collection unit as previously stated may advantageously be provided by a plurality of entities in a hierarchical architecture. In an architecture of this kind, a collection unit comprises a plurality of collection entities and a central entity.

The terminal and the measurement unit are then connected to at least one of the collection entities.

For example, a terminal may send packet stream descriptions to one of the collection entities and a measurement unit can send stream descriptions to another collection entity. Each of those collection entities can then forward the descriptions received to the central entity, which identifies each analyzed packet of the stream as a function of the stream description in order to correlate, packet by packet, the stream description and the packet stream description received in this way.

The invention claimed is:

1. A measurement method for use in a data packet transmission network, wherein a stream of packets of data sent by a first terminal passes in transit through at least one network equipment with which there is associated a stream measurement unit; wherein said first terminal and said measurement unit are connected to a collection unit; said method comprising the following steps:
    the first terminal sending a specific stream of packets, each having a different determined size, the sizes being such that in a set of r packets, r being a positive integer less than or equal to the number of packets of the stream, there are not any two subsets of said set of r packets comprising the same number of packets and having the same cumulative total size;
    the measurement unit analyzing at least one packet and at most r packets of said stream passing in transit through the network equipment;
    the first terminal sending the collection unit a sent packet stream description, comprising a list including at least said determined sizes of the sent packets;
    the stream measurement unit sending the collection unit a stream description comprising at least the number of analyzed packets and a sum of determined sizes of the analyzed packets; and
    the collection unit identifying each analyzed packet of the stream as a function of the stream description and of said determined sizes of the sent packets in order to correlate said stream description and said sent packet stream description packet by packet.

2. The method as claimed in claim 1, wherein at least one second terminal connected to the collection unit receives the stream of packets and sends a received packet stream description comprising the number of packets received to the collection unit; and wherein the collection unit identifies each analyzed packet in order to correlate the stream description and the packet stream descriptions packet by packet.

3. The method as claimed claim 1, wherein the collection unit determines a loss of packets relating to a segment between the first terminal and the equipment by correlation of the list relating to the sent packets and the analyzed packets.

4. The method as claimed in claim 2, wherein the collection unit determines a loss of packets relating to a segment between the equipment and the second terminal by correlation of the list relating to the received packets and the analyzed packets.

5. The method as claimed in claim 2, wherein the packet stream descriptions comprise a time reference of sending by the first terminal and/or of reception by the second terminal for each packet of the stream and the stream descriptions further comprise a time reference for the passage through the equipment of the first and last analyzed packets, and wherein the collection unit determines a transmission lead time of said first and last analyzed packets relating to a segment between a terminal and the equipment by correlation of said time references of the packets.

6. The method as claimed in claim 1, wherein the first terminal generates or stores a plurality of specific streams; and wherein the stream sending step is preceded by a stream selection step.

7. The method as claimed in claim 1, wherein the collection unit generates one or more specific streams and sends the generated streams to the first terminal as a function of determined criteria.

8. The method as claimed in claim 1, wherein the collection unit generates packet identification tables as a function of the specific stream or streams in order to identify the analyzed packets in the specific stream.

9. The method as claimed in claim 1, wherein a plurality of network equipments is provided with respective measurement units and wherein the collection unit supplies at least one of the following information instantaneously:

information relating to the path of the packets of the stream in the network;

information relating to management of the equipments of the path of the stream in the network;

information relating to processing of the stream in the equipments of the path;

network performance information relating to a loss of packets on a segment between a terminal and an equipment or between two equipments;

network performance information relating to a packet transmission lead time relating to a segment between a terminal and an equipment or between two equipments;

network performance information relating to a packet transmission lead time variation relating to a segment between a terminal and an equipment or between two equipments.

10. The method as claimed in claim 9, wherein at least one of the measurement units supplies by iteration of the steps of the method as claimed in claim 1 at least one statistic of the following measurements relating to a segment between a terminal and an equipment or between two equipments:

a loss of packets;

a packet transmission lead time; and a transmission lead time variation.

11. The method as claimed in claim 1, wherein the measurement unit analyzes a subset of packets of the stream selected from the packets of the stream received by the equipment.

12. A collection unit for use in a data packet transmission network, said collection unit comprising:

means for collecting at least one sent packet stream description in a specific stream of packets each having a different determined size, the sizes being such that in a set of r packets, r being a positive integer less than or equal to the number of packets of the stream, there are not any two subsets of said set of r packets comprising the same number of packets and having the same cumulative total size, said stream description comprising a list including at least the determined sizes of the sent packets;

means for collecting at least one stream description received from a measurement unit that is adapted to analyze at least one packet and at most r packets of said specific stream, a stream description comprising at least the number of analyzed packets and a sum of determined sizes of analyzed packets;

correlation means adapted to identify each analyzed packet of the stream as a function of the stream description and of the determined sizes of the sent packets, and to correlate said stream description and said sent packet stream description packet by packet.

13. A measurement system for use in a data packet transmission network comprising:

at least one terminal comprising:

means for generating a specific stream of packets, each having a different determined size, the sizes being such that in a set of r packets, r being a positive integer less than or equal to the number of packets of the stream, there are not any two subsets of said set of r packets comprising the same number of packets and having the same cumulative total size; and means for sending a sent packet stream description comprising a list including at least said determined sizes of the sent packets;

a collection unit comprising:

means for collecting at least one stream description of sent packets in a specific stream of packets each having a different determined size, the sizes being such that in a set of r packets, r being a positive integer less than or equal to the number of packets of the stream, there are not any two subsets of said set of r packets comprising the same number of packets and having the same cumulative total size, said stream description comprising a list including at least the determined sizes of the sent packets;

means for collecting at least one stream description received from a measurement unit that is adapted to analyze at least one packet and at most r packets of said specific stream, a stream description comprising at least the number of analyzed packets and a sum of determined sizes of analyzed packets;

correlation means adapted to identify each analyzed packet of the stream as a function of the stream description and of the determined sizes of the sent packets, and to correlate stream descriptions and packet stream descriptions packet by packet; and at least one measurement unit associated with an equipment of the network comprising means for analyzing at least one packet and at most r packets of the stream, r being a positive integer less than or equal to the number of packets of the stream, and means for sending said collection unit a stream description comprising at least the number of analyzed packets and a sum of the determined sizes of the analyzed packets.

* * * * *